(12) United States Patent
Moldoveanu

(10) Patent No.: US 8,612,157 B2
(45) Date of Patent: Dec. 17, 2013

(54) METHOD TO ATTENUATE STRONG MARINE SEISMIC NOISE

(75) Inventor: Nicolae Moldoveanu, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 358 days.

(21) Appl. No.: 12/832,247

(22) Filed: Jul. 8, 2010

(65) Prior Publication Data

US 2012/0008458 A1     Jan. 12, 2012

(51) Int. Cl.
*G01V 1/40*   (2006.01)
*G01V 1/02*   (2006.01)
*G01V 1/053*  (2006.01)
*G06F 3/00*   (2006.01)

(52) U.S. Cl.
USPC .................. 702/17; 702/14; 702/16; 702/179

(58) Field of Classification Search
USPC ............... 702/14, 16, 17, 179, 182, 183, 189; 181/108; 367/41, 61
See application file for complete search history.

(56) References Cited

U.S. PATENT DOCUMENTS

| | | | |
|---|---|---|---|
| 4,072,922 A * | 2/1978 | Taner et al. | 367/63 |
| 4,259,733 A * | 3/1981 | Taner et al. | 367/61 |
| 4,922,465 A | 5/1990 | Pieprzak et al. | |
| 5,051,960 A * | 9/1991 | Levin | 367/24 |
| 5,175,710 A * | 12/1992 | Hutson | 367/135 |
| 5,719,821 A * | 2/1998 | Sallas et al. | 367/41 |
| 5,798,982 A * | 8/1998 | He et al. | 367/73 |
| 6,292,755 B2 | 9/2001 | Chambers et al. | |
| 7,400,552 B2 * | 7/2008 | Moldoveanu et al. | 367/16 |
| 7,660,192 B2 * | 2/2010 | Paulsen | 367/19 |
| 7,914,451 B2 * | 3/2011 | Davies | 600/437 |
| 7,974,151 B2 * | 7/2011 | Iranpour et al. | 367/15 |
| 2004/0054528 A1 | 3/2004 | Hoya et al. | |
| 2008/0285381 A1 | 11/2008 | Moldoveanu et al. | |
| 2009/0003134 A1 | 1/2009 | Nuttall et al. | |

OTHER PUBLICATIONS

Cary, et al., Ground Roll Attenuation with Adaptive Eigenimage Filtering, SEG Houston 2009 International Exposition and Annual Meeting, pp. 3302-3306.
International Search Report of PCT Application No. PCT/US2011/041552 dated Mar. 2, 2012: pp. 1-3.

* cited by examiner

*Primary Examiner* — Marc Armand
*Assistant Examiner* — Felix Suarez

(57) ABSTRACT

Methods to attenuating strong marine seismic noises using singular value decomposition, determining noisiest traces and estimating noise components only from these traces, iteratively estimating the noise and protecting signal behind the noise. It is submitted with the understanding that it will not be used to interpret or limit the scope or meaning of the claims. 37 CFR 1.72(b).

23 Claims, 6 Drawing Sheets

METHOD TO ATTENUATE STRONG MARINE SEISMIC NOISE

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The present invention relates to the field of marine survey data acquisition and processing methods. More specifically, the invention relates to methods for attenuating strong marine seismic noise.

2. Discussion of Related Art

To achieve high density surveys in regions having a combination of imaging and logistical challenges, a high trace density and closely spaced streamers may be used, however, this presents the potential of entangling and damaging streamer cables and associated equipment, unless streamer steering devices are closely monitored and controlled. Wide-azimuth towed streamer survey data is typically acquired using multiple vessels, for example: one streamer vessel and two source vessels; two streamer vessels and two source vessels; or one streamer vessel and three source vessels. Many possible marine seismic spreads comprising streamers, streamer vessels, and source vessels may be envisioned for obtaining wide- or rich-azimuth survey data. Assignee's U.S. Pat. No. 7,400,552, discusses some of these. This patent discusses shooting and acquiring marine seismic data during turns of linear marine surveys and during curvilinear paths. A great leap in acquisition technology was described in another assignee's co-pending application Ser. No. 12/121,324, filed on May 15, 2008, which describes methods for efficiently acquiring wide-azimuth towed streamer seismic data, which is also known as the "coil shooting" technique. These non-linear survey methods deviate greatly from the traditional straight line surveys and frequently encounter a lot more noises from various sources, such as ocean current, towing mechanism, steering devices.

Regardless the acquisition methods used in seismic survey, the noise attenuation is always a major issue during data processing. There are many methods to attenuate noises. The methods could be classified into three categories:

methods to discriminate the noise from the signal based on apparent velocities;

methods to discriminate the noise from the signal based on amplitudes; or methods that adaptively estimate the noises based on noise coherency.

Seismic data acquired in the presence of marine currents could be affected by very strong noise that could contaminate a large number of traces. When the noise energy is comparable to the signal energy, then the noise is referred to as strong noise; when the noise energy is greater than the signal energy, then the noise is very strong noise. The existent noise attenuation methods applied on such data do not perform well and the results typically have large amount of noise left and the signal amplitudes are not accurately preserved.

One way to handle these cases is to apply a combination of different methods that requires sorting the data in different domains, like common receiver domain or common offset domain and this could make the processing quite expensive.

While the Q suite of advanced technologies for marine seismic data acquisition and processing may provide detailed images desired for many reservoir management decisions, it is desirable to have methods that can improve the data quality and reduce the processing costs.

References:

[1]. Peter W. Cary, Changjun Zhang, "Ground roll attenuation with adaptive eigenimage filtering", SEG 2009, Houston, Tex.

BRIEF SUMMARY OF THE INVENTION

The methods proposed here are based on amplitude discrimination between signal and noise. We use a novel approach for noise estimation, where the methods attenuate strong marine noise that could be caused by marine currents, waves, equipment, seismic interferences, etc. The methods use singular value decomposition, determining noisiest traces and estimating noise components only from these traces, iteratively estimating the noise and protecting signal behind the noise.

BRIEF DESCRIPTION OF THE SEVERAL VIEWS OF THE DRAWINGS

A better understanding of the invention can be had when the following detailed description of the preferred embodiments is considered in conjunction with the following drawings, in which.

Figure 1:
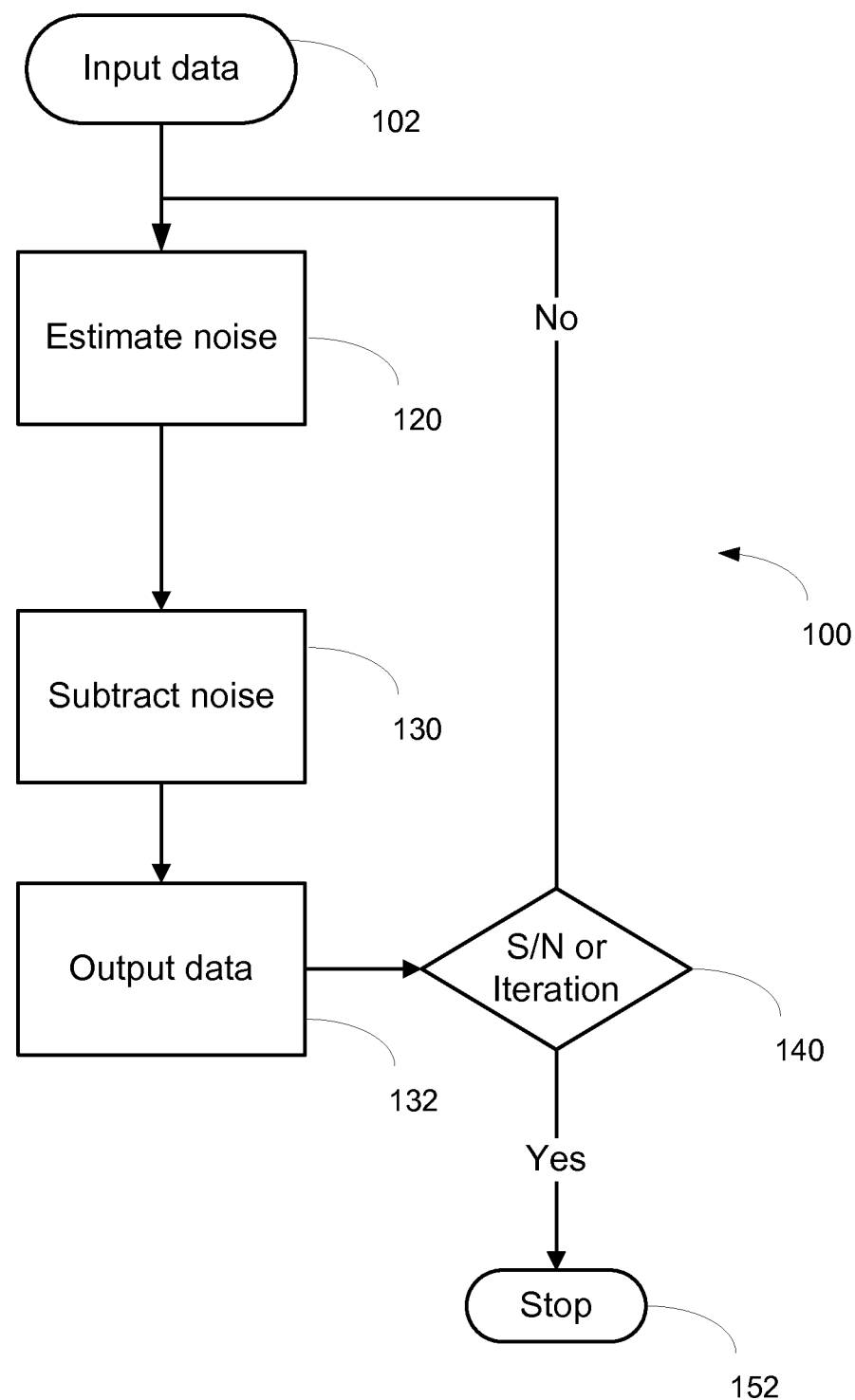
FIG. 1 shows a flow diagram of an embodiment of the current invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION OF THE INVENTION

In the following description, numerous details are set forth to provide an understanding of the present invention. However, it will be understood by those skilled in the art that the present invention may be practiced without these details and that numerous variations or modifications from the described embodiments may be possible. For example, in the discussion herein, aspects of the invention are developed within the general context of acquiring high quality marine seismic data in a more cost efficient manner, which may employ computer-executable instructions, such as program modules, being executed by one or more conventional computers. It is noted, however, that modification to the systems and methods described herein may well be made without deviating from the scope of the present invention. Moreover, those skilled in the art will appreciate, from the discussion to follow, that the principles of the invention may well be applied to other aspects of seismic data acquisition and data processing. Thus, the systems and method described below are but illustrative implementations of a broader inventive concept.

Mathematical Background

It is well known from linear algebra the operation of singular value decomposition for a given matrix D (m,n), where m=number of rows and n=number of columns. Singular value decomposition applied to the matrix D produces a diagonal matrix S (n, n) of dimension (n,n), and unitary matrixes U and V, so that:

$$D = U*S*V' \quad (1)$$

where V' is the transpose of V. U has the dimension (m,n), S has the dimension (n,n) and V has the dimension (n,m). S is a diagonal matrix that has the elements S11, S22, ... Snn, and S11>S22>S33> ... >.Snn. The elements of the matrix S are the eigenvalues of the matrix D.

If for the matrix D (m,n) we calculate only the largest k eigenvalues, than we can find the matrixes U1(m,k), S1(k,k) and V1(k,n) such that $$N = U1*S1*V1' \quad (2)$$

N matrix has the same dimension as the matrix D but the elements are different. Matrix N only has the largest k eigenvalues, S11 through Skk, of Matrix D.

Consider a matrix D (ns, nt), which is the mathematical representation of a seismic shot gather that has ns samples in time and nt samples in space, i.e, the shot gather has nt traces and each trace has ns samples. The elements of the matrix D are the amplitude values of the seismic wavefield sampled in time and space.

The geophysical application of singular value decomposition for attenuation of the strong marine noise is based on two assumptions:

1) D=S+N, where S=seismic signal and N=seismic noise
2) We can discriminate the seismic amplitudes based on the selection of the eigenvalues: the largest eigenvalues correspond to the largest amplitude values. If we assume that we selected the largest k eigenvalues and these represent the noise part of the seismic data D, then the matrix N is an estimate of the noise. The estimated noise can be removed from the original data D by a simple matrix subtraction:

$$S1 = D - N \quad (3)$$

where S1 is a representation of the seismic signal plus residual noise.

It can be difficult to determine the number of eigenvalues that can adequately represent the noise while preserving the signals. The "noise-free" matrix S1 may still contain excessive residual noises.

FIG. 1 illustrates the overall flow diagram 100 of one of the methods to estimate and attenuate the noises while preserving the signals. The input data D 102, go through the noise estimation or determination step 120. The estimated noise is subtracted from the input data D at step 130 to generate output data 132. The process is an iterative process. The output data 132 may be tested for its Signal/Noise (S/N) ratio at step 140. If the S/N ratio reaches a preset threshold, the process stops at 152. If not, the output data is treated as input data to step 120 to go through one or more iterations. Instead of testing a S/N ratio at each iteration, a total number of iteration may be set. Once the predetermined number of iterations has run, the process stops at 152.

The number of iterations or the threshold S/N ratio is determined based on the evaluation of Signal/Noise ratio in the data. It is determined as a function of the noise level in each shot.

Energy Analysis

Figure 3:
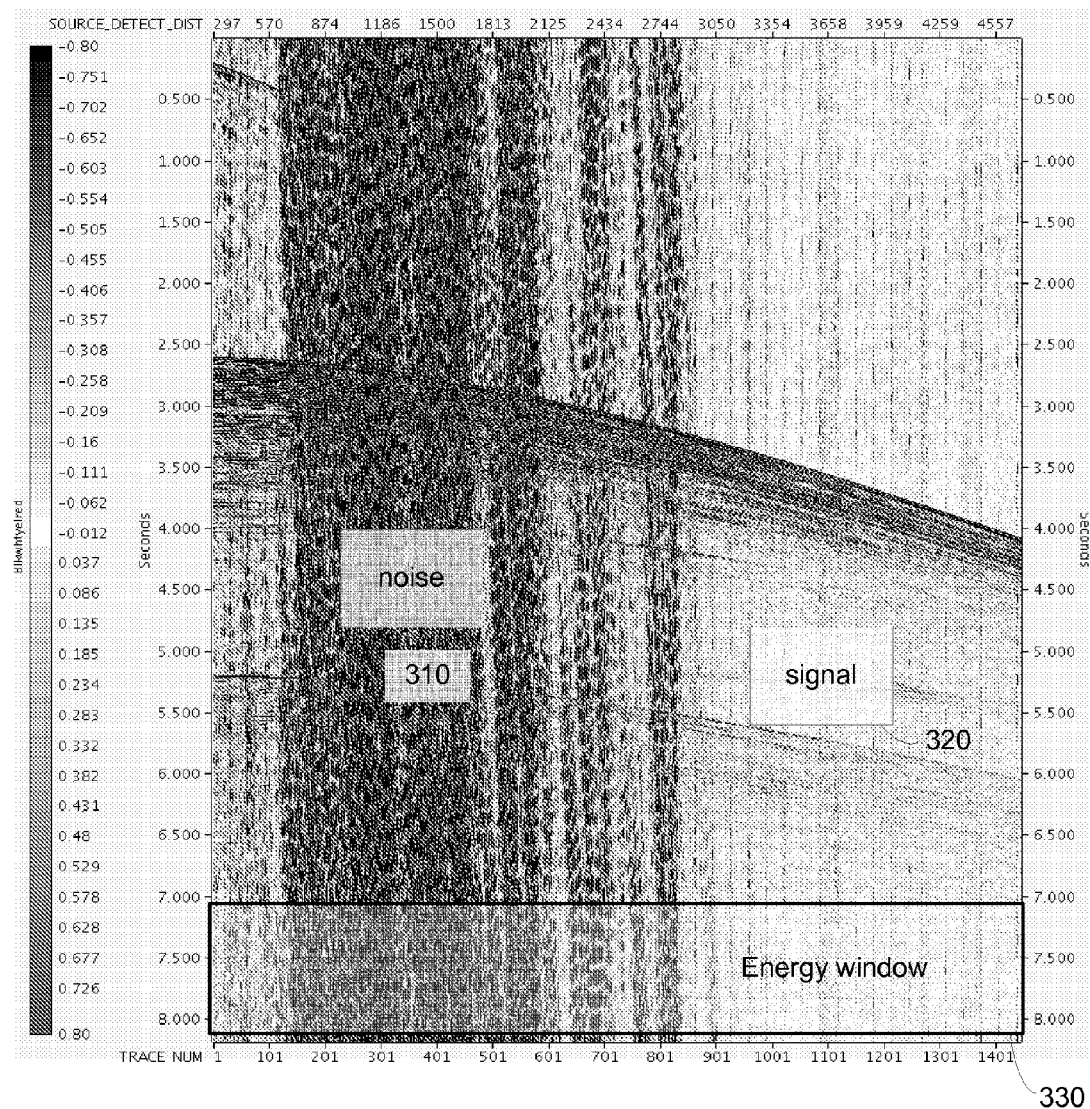
FIG. 3 shows raw single sensor data.
Figure 4:
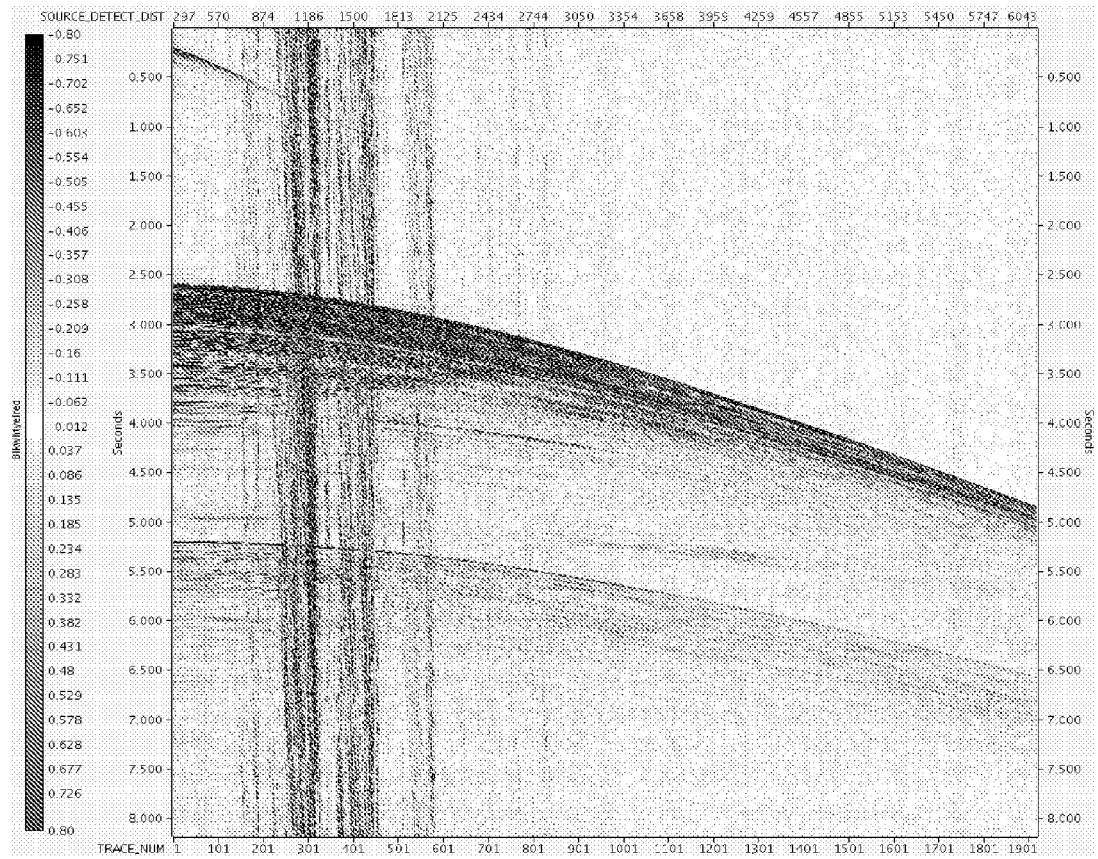
FIG. 4 shows the same data as in FIG. 3 after removing noise using a method of the current invention.

FIG. 3 illustrates a sample of raw data and FIG. 4 illustrates the data with noise attenuation method applied. An energy analysis may be done on the raw dataset which is to be processed.

In FIG. 3, three windows are picked, one for noise window 310, a second for signal window 320 and a third 330 for energy analysis window. The noise window 310 and signal window 320 may be selected based on their signal and noise contents. The noise window 310 is selected because the noise content predominates and the signal is almost invisible. The signal window 320 is just the opposite, where the noise content is small and signal amplitude is much larger than noise.

Using traces within noise window 310, a noise matrix can be constructed and subject to singular value decomposition. Its eigenvalues (noise eigenvalues) can be calculated. Similarly, traces within signal window 320, a signal matrix can be constructed and its eigenvalues (signal eigenvalues) computed. The noise eigenvalues and signal eigenvalues can be compared, their ranges are determined. A range of noise eigenvalues can be set to be used in later process. In an alternative, the number of iterations can be set, which is the number of iterations the noise attenuation procedures are applied to data to be processed.

Energy analysis window 330 is selected to be a window where parts of all traces are present. The window 330 contains no significant signals. It is typically chosen near the bottom of a seismogram, as shown in FIG. 3. For each trace within window 330, its total energy (amplitude) is calculated. The average of the trace energy is also calculated. Based on the average trace energy, noise/signal energy thresholds can be determined. If the trace energy is above the noisy threshold, then the trace is considered noisy, and will be treated with the noise attenuation method as described below. If the trace energy is below the signal energy threshold, the trace is considered clean, i.e. with little noise, and will be left alone. The clean trace is not subject to noise attenuation and all signal strength is preserved. For simplicity, the noise threshold and the signal threshold can be set as the same and same as the average trace energy. The two thresholds may also be set at different levels for better noise attenuation and/or signal preservation.

Based on the energy analysis or other knowledge of the particular dataset to be processed, a user may define other processing criteria which may affect the application of the noise attenuation methods described below.

The number of required iterations can be determined as described above in an "analysis" phase. The results, such as the energy of the noisy traces and/or the average energy values may be stored in the trace headers. The user can run singular value decomposition, estimate the noise, and determine the number of iterations that is required and the number of eigenvalues that have to be used to estimate the noise as a function of the noise level in each shot at this phase. When the data are actually processed, in an "execution" phase, the headers are examined and the number of iterations and/or the eigenvalue range for each shot are used. This optional energy analysis may be done before the "execution" phase, where the dataset is actually processed. It can be done during the "execution" step during some noise estimation and removal iterations. The energy analysis helps to determine whether the noise attenuation is adequately performed.

Description of the Strong Noise Estimation Method

Figure 2:
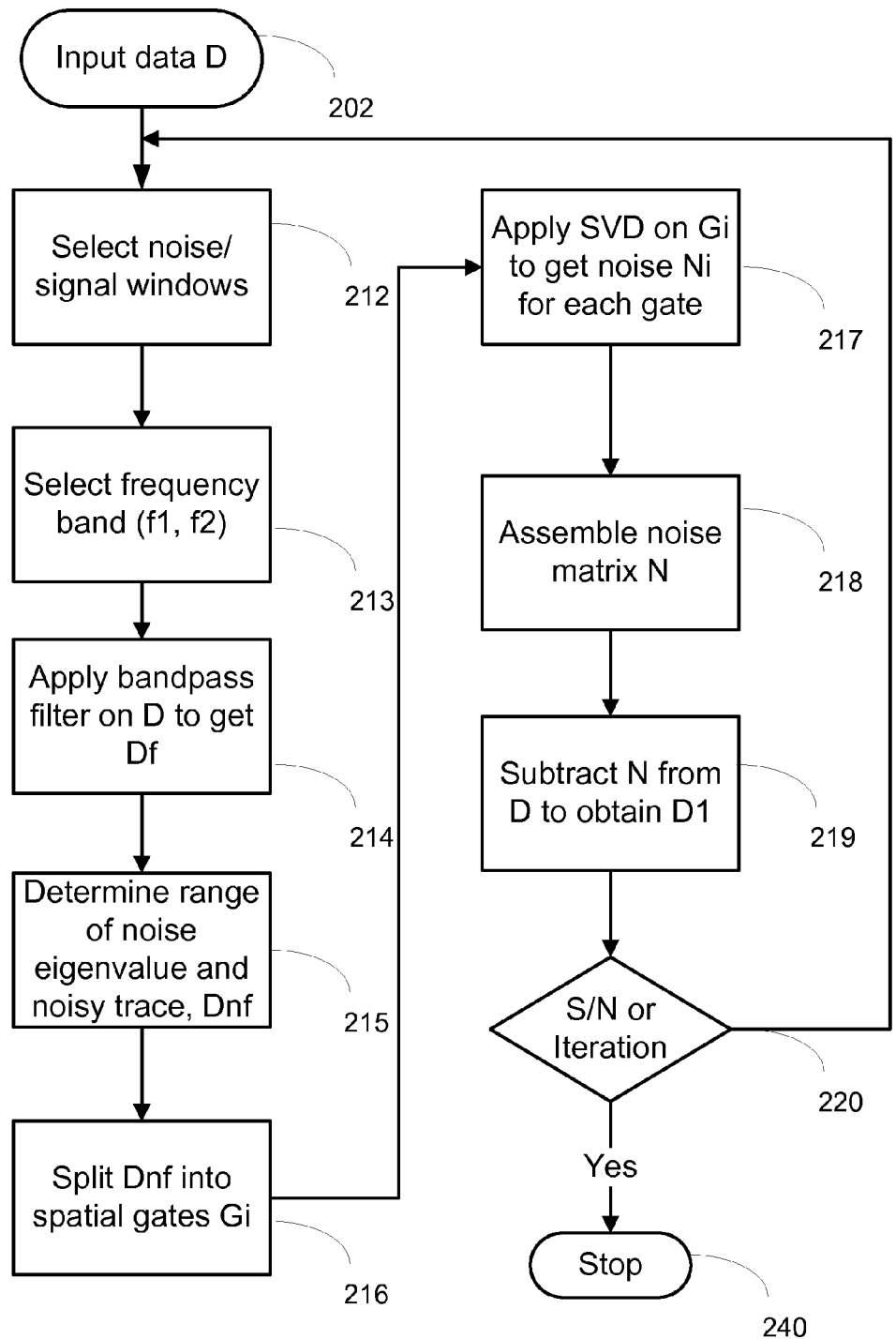
FIG. 2 shows a flow diagram of another embodiment of the current invention.

FIG. 2 illustrates a flow diagram of the noise estimation process using singular value decomposition that is to attenuate strong noises in an input dataset D.

1. Input data set is a shot gather represented by a matrix D 202.

2. In an optional step 212, several windows may be selected to represent noises, signals as described above. The windows may be selected for full spectrum data or they may be selected later on within a band-limited data. From the windows, target Signal/Noise Ratio or number of iterations for the process are determined.

3. In an optional step 213, a frequency range (f1,f2) is determined, where the noise dominates the signal. Determine the frequency ranges where the noise is above the signal. This can be done by frequency analysis. The noise could be present in frequency ranges (f1,f2), (f3,f4), etc. The noise estimation and subtraction will be done for each frequency range. For simplicity, only one frequency range (f1, f2) is discussed below.

4. In an optional step 214, where noise dominates within the frequency band (f1, f2), a bandpass filter (f1,f2) is applied to the input data D and generate a filtered data set Df. Df contains signal and noise, primarily in the frequency band (f1, f2). It will be used to find the noise in this frequency band.

5. In step 215, from Df determine the range of eigenvalues corresponding to the noise and the range of eigenvalues corresponding to the signal. This is done by calculating eigenvalues in a "noise" window, defined in space and time, where the noise is present, and a "signal" window, defined in space and time, where only the signal is present. FIG. 3 shows a shot gather and the windows selected for noise and signal.

The noise window and the signal window can be determined as described above or based on other user defined parameters.

From the matrix Df noisy traces are determined. This is typically done as discussed above, but in a bandpass filtered dataset Df. The trace energy for each trace in a window defined by the user as discussed above is calculated. The shot average energy is calculated and the energy of each trace is compared with the shot average energy. If the trace energy is larger than average energy the respective trace is considered a noisy trace. All noisy traces are collected in a matrix, Dnf. Unlike matrix Df, Dnf only contains noisy traces and does not contain clean signal traces.

6. In step 216, split the data Dnf in spatial gates, based on user defined parameters; each spatial gate is represented by a matrix Gi.

7. In step 217, apply singular value decomposition on each matrix Gi, using the range of eigenvalues for the noise and the signal determined in step 215. From each matrix Gi, the noise Ni is estimated.

8. In step 218, all noise estimate matrices Ni are collected and assembled into a noise matrix N. This matrix N has the same dimension as the input matrix D, other matrices Df or Dnf all of which were derived from matrix D.

9. In step 219, the noise matrix N is subtracted from the input data matrix D; the result is a matrix D1. Since the noise matrix N is derived from data matrix Dnf, which is limited in frequency band (f1, f2) and only the noisy traces, the signals in all other traces or other frequencies are not affected and preserved.

10. In step 220, the data matrix D1 may be reviewed. In one method, the traces in data D1 where the residual noise is still above the signal is determined. This can be done by evaluating the RMS amplitude in a window specified by the user. If yes, i.e. the noise level is high, make the D1 matrix as original D matrix and repeat the steps above. If no, the process is done.

Alternatively, the total number of iteration, as discussed above, is set before hand, based on the noise/signal energy estimate. Unless the total number of iteration is reached, go to step 215 to repeat the noise estimation and removal process. Once the total number of iteration is reached, the process stops.

In each iteration in the above noise estimation and removal procedures, strong noises within noisy traces are estimated and removed. The traces having low or no noises are left alone and not touched. Therefore, the signals, however small, are preserved. The noise estimation is done within a frequency band. Similar to the treatment of noisy/clean traces, signals in frequency band not processed are not affected and preserved.

After each iteration, the strong noise in a trace within the frequency band is attenuated. So the noise level among the traces will change and the "noise" status of a trace may change as well. The traces that have the highest noise level will be attenuated.

In the above example, only one frequency band (f1, f2) is treated. If more frequency bands have strong noises, then the process is performed on each of those other bands. If strong noises are present in all spectra, then such noises may be attenuated first, without band filtering.

Noises from different sources typically only affect a particular frequency band or some traces. For example, the streamer towing noises are low frequency noise. The noises due to ocean waves are in another band but are present in all traces. The strong noises due to streamer turning may affect some traces but not all. Generally the marine noise due to streamer towing or marine currents dominates the very low frequencies from 0 Hz to 10 Hz.

An alternative to the fixed number of iteration, an adaptive process may be used, where criteria to stop the noise attenuation may be based on the results of the last iteration. At the beginning of each iteration, noise/signal windows are determined by their energy level. From that, noise traces and signal traces are determined, which in turn determines the target signal/noise ratio for the iteration. If the target signal/noise ratio is achieved, the noise attenuation is done.

Another possibility is to determine the level of noise estimated at iteration i'th with the level of noise estimated at the previous iteration, i−1. If the difference is negligible the process is stopped.

Figure 5:
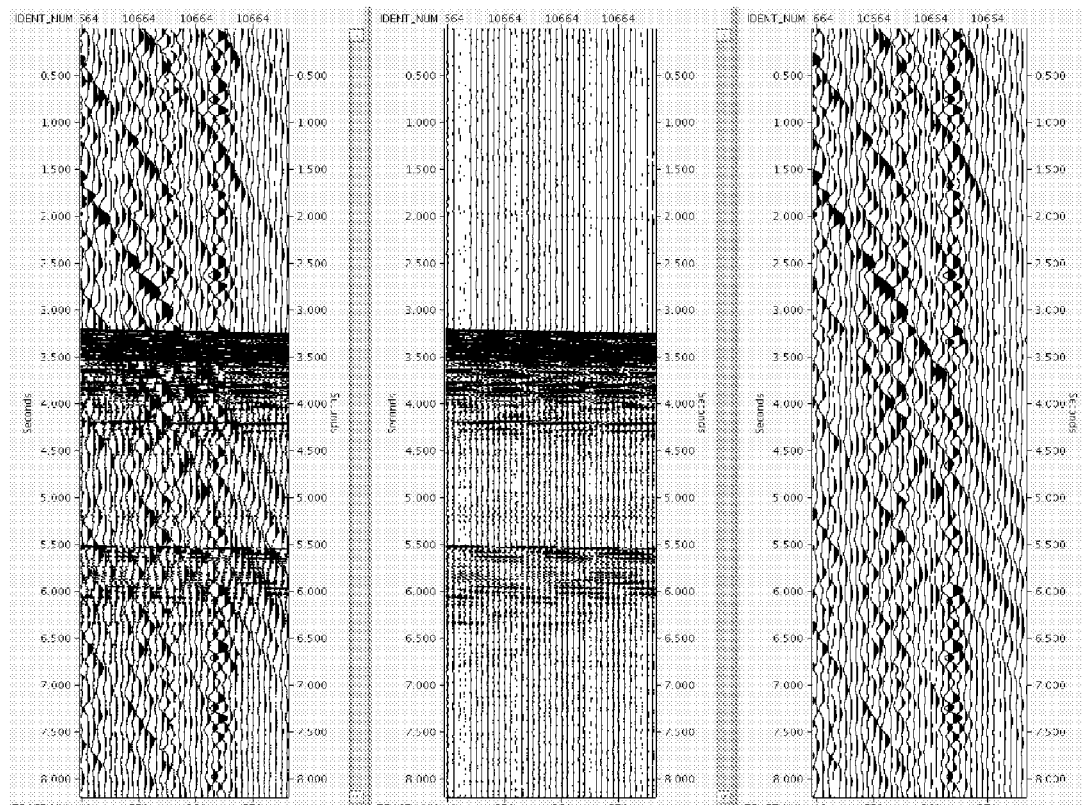
FIG. 5 shows another example of comparing the input data, the data after noise attenuation and the noise removed.

FIG. 5 shows another example: input data (left panel), data after noise attenuation (middle panel) and the difference between the input data and the data after noise attenuation, i.e. the noise that was removed. (right panel). It is clear that one of the current methods successfully attenuated strong noises in most of the traces, while preserved the low strength signals.

There are many benefits of the methods described above. They include at least the following:

- use of singular value decomposition to evaluate the strong marine noise;
- determine the noisiest traces and estimate the noise component only from these traces;
- iterative estimation of the noise using singular value decomposition;
- protect the signal behind the noise;
- the method is applied only in the shot domain and does not require any data sorting; and
- the method is not sensitive to aliasing
- very efficient from computation point of view.

The methods described above can be and typically is used together with many other noise attenuation methods to achieve the desired objective in seismic data processing. They can be used first on the raw dataset in a data processing flow before all other data processing methods. This way, the signals, which may have much lower amplitudes, are not overwhelmed by the strong noises. Once the data are processed, they can be presented showing subsurface structures containing interested materials, such as hydrocarbon or minerals. The identified structures can be used to produce the interested materials, such as hydrocarbon.

The methods described above can be performed in an onshore data processing office after a survey or in a geophysical surveying vessel during a survey. The on-board processing can provide immediate feedback on the data acquired during the survey and may cause some adjustments in the survey plan to optimize the survey results.

Figure 6:
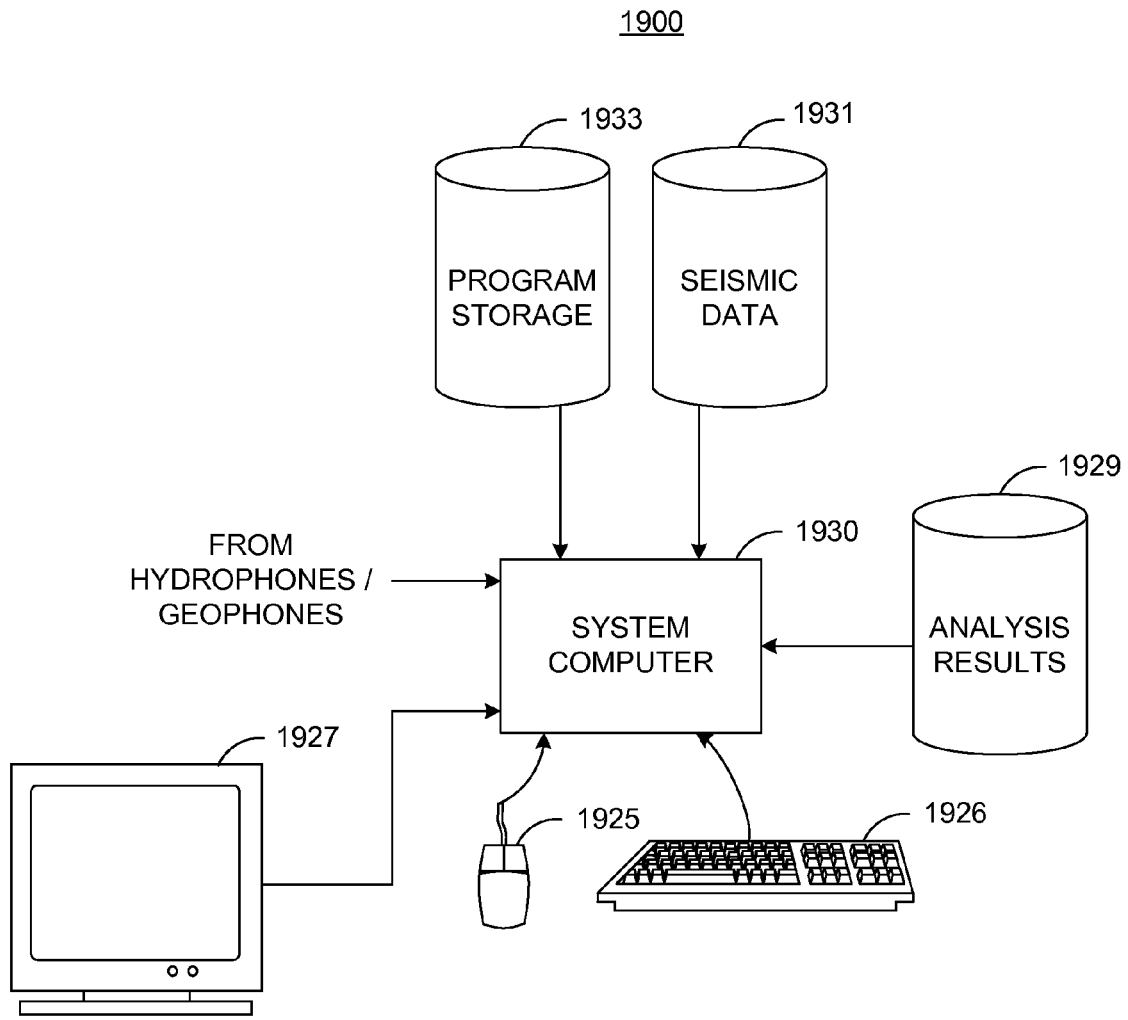
FIG. 6 shows a typical computer system that may be used to implement the methods of the current invention.

The methods described above are typically implemented in a computer system 1900, one of which is shown in FIG. 6. The system computer 1930 may be in communication with disk storage devices 1929, 1931, 1933 and 1935, which may be external hard disk storage devices. It is contemplated that disk storage devices 1929, 1931, 1933 and 1935 are conventional hard disk drives, and as such, will be implemented by way of a local area network or by remote access. Of course, while disk storage devices are illustrated as separate devices, a single disk storage device may be used to store any and all of the program instructions, measurement data, and results as desired.

In one implementation, seismic data from the seismic receivers may be stored in disk storage device 1931. Various non-seismic data from different sources may be stored in disk storage device 1933. The system computer 1930 may retrieve the appropriate data from the disk storage devices 1931 or 1933 to process data according to program instructions that correspond to implementations of various techniques described herein. The program instructions may be written in a computer programming language, such as C++, Java and the like. The program instructions may be stored in a computer-readable medium, such as program disk storage device 1935. Such computer-readable media may include computer storage media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1930. Combinations of any of the above may also be included within the scope of computer readable media.

In one implementation, the system computer 1930 may present output primarily onto graphics display 1927, or alternatively via printer 1928 (not shown). The system computer 1930 may store the results of the methods described above on disk storage 1929, for later use and further analysis. The keyboard 1926 and the pointing device (e.g., a mouse, trackball, or the like) 1925 may be provided with the system computer 1930 to enable interactive operation.

The system computer 1930 may be located at a data center remote from an exploration field. The system computer 1930 may be in communication with equipment on site to receive data of various measurements. The system computer 1930 may also be located on site in a field to provide faster feedback and guidance for the field operation. Such data, after conventional formatting and other initial processing, may be stored by the system computer 1930 as digital data in the disk storage 1931 or 1933 for subsequent retrieval and processing in the manner described above. While FIG. 19 illustrates the disk storage, e.g. 1931 as directly connected to the system computer 1930, it is also contemplated that the disk storage device may be accessible through a local area network or by remote access. Furthermore, while disk storage devices 1929, 1931 are illustrated as separate devices for storing input seismic data and analysis results, the disk storage devices 1929, 1931 may be implemented within a single disk drive (either together with or separately from program disk storage device 1933), or in any other conventional manner as will be fully understood by one of skill in the art having reference to this specification.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

I claim:

1. A method of attenuating survey noises in a dataset D of a geophysical survey implemented with a computer system, the method comprising:
   a noise determination step, comprising:
      determining noisy traces based on the dataset D;
      forming a data matrix Dnf containing the noisy traces;
      splitting the data matrix Dnf into one or more spatial gates Gi;
      performing singular value decomposition on the one or more spatial gates Gi to estimate noise Ni; and
      forming a noise matrix N based on the noise Ni; and
   a noise subtracting step, comprising subtracting, using a microprocessor, the noise matrix N from the dataset D to produce a dataset D1.

2. The method in claim 1, further comprising: performing at least one of the steps on a geophysical marine surveying vessel.

3. The method in claim 1, further comprising selecting a window within the dataset D to analyze energy of respective traces of the dataset.

4. The method in claim 1, further comprising a repeating-decision step, comprising:
   repeating the noise determination step and the noise subtracting step based on at least one criterion.

5. The method in claim 1, wherein forming the noise matrix N based on the noise Ni comprises assembling all noise Ni into the noise matrix N.

6. The method in claim 3, wherein determining the noisy traces comprises:
   computing trace energy for each trace and the average of all traces in the window; and
   determining a trace as a noisy trace if its energy is above a noise threshold which is a function of an average trace energy.

7. The method in claim 4, further comprising an energy analysis step, which comprises:
   identifying a frequency band (f1, f2) where noise is present in the dataset D; and
   bandpass-filtering the dataset D to generate a bandpass-filtered dataset Df, wherein dataset Df is used in the noise determination step.

8. The method in claim 4, wherein the at least one criterion is a preset total number of iteration or a preset signal to noise (S/N) ratio for traces in the dataset D1.

9. The method in claim 7, wherein the energy analysis step further comprises:
 selecting a noise window wherein the noise is present;
 selecting a signal window wherein signal is present; and
 determining the at least one criterion for the repeating-decision step.

10. The method in claim 7, wherein the energy analysis step is performed within the noise determination step and is performed adaptively.

11. The method in claim 9, wherein the at least one criterion for the repeating-decision step is a number of total iteration, wherein when the number of total iteration is reached, the noise attenuation is finished.

12. The method in claim 9, wherein the at least one criterion for the repeating-decision step is a signal to noise ratio (S/N) threshold, where once the S/N threshold is reached, the noise attenuation is finished.

13. The method in claim 9, wherein the at least one criterion for the repeating-decision step is a difference in a signal to noise (S/N) ratio between two adjacent iteration, where once the difference is below a threshold, the noise attenuation is finished.

14. The method in claim 9, wherein the energy analysis step further comprises:
 representing the noise window and the signal window as two matrices;
 performing singular value decomposition on the two matrices to generate eigenvalues for each matrix; and
 determining a range of noise eigenvalues to be used in the noise determination step.

15. A system for attenuating survey noises in a dataset D of a geophysical survey, the system comprising:
 a data processor; and
 a data storage holding the dataset D and processing instructions, wherein the instructions cause the data processor to perform:
  a noise determination step, comprising:
   determining noisy traces based on the dataset D;
   forming a data matrix Dnf containing the noisy traces;
   splitting the data matrix Dnf into one or more spatial gates Gi;
   performing singular value decomposition on the one or more spatial gates Gi to estimate noise Ni; and
   forming a noise matrix N based on the noise Ni; and
  a noise subtracting step, comprising subtracting the noise matrix N from the dataset D to produce a dataset D1.

16. The system in claim 15, further comprising: a geophysical marine surveying vessel wherein the data processor and data storage reside.

17. The system in claim 15, wherein the instructions further comprise a repeating-decision step, comprising:
 repeating the noise determination step and the noise subtracting step based on at least one criterion.

18. The system in claim 15, wherein the instructions further comprise selecting a window within the dataset D to analyze energy of respective traces of the dataset.

19. The system in claim 17, wherein the instructions further comprise an energy analysis step, which comprises:
 identifying a frequency band (f1, f2) where noise is present in the dataset D; and
 bandpass-filtering the dataset D to generate a bandpass-filtered dataset Df, wherein dataset Df is used in the noise determination step.

20. The system in claim 17, wherein the at least one criterion is a preset total number of iteration or a preset signal to noise (S/N) ratio for traces in the dataset D1.

21. The system in claim 18, wherein determining the noisy traces comprises:
 computing trace energy for each trace and the average of all traces in the window; and
 determining a trace as a noisy trace if its energy is above a noise threshold which is a function of an average trace energy.

22. The system in claim 19, wherein the energy analysis step further comprises:
 selecting a noise window wherein the noise is present;
 selecting a signal window wherein signal is present; and
 determining the at least one criterion for the repeating-decision step.

23. The system in claim 22, wherein the energy analysis step further comprises:
 representing the noise window and the signal window as two matrices;
 performing singular value decomposition on the two matrices to generate eigenvalues for each matrix; and
 determining the eigenvalues ranges of noises to be used in the noise determination step.

\* \* \* \* \*